United States Patent
Nguyen (10) Patent No.: US 7,107,433 B1
(45) Date of Patent: Sep. 12, 2006

(54) MECHANISM FOR RESOURCE ALLOCATION IN A DIGITAL SIGNAL PROCESSOR BASED ON INSTRUCTION TYPE INFORMATION AND FUNCTIONAL PRIORITY AND METHOD OF OPERATION THEREOF

(75) Inventor: Hung T. Nguyen, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 436 days.

(21) Appl. No.: 10/066,147

(22) Filed: Oct. 26, 2001

(51) Int. Cl.
*G06F 9/30* (2006.01)

(52) U.S. Cl. ............... 712/217; 712/215; 712/206

(58) Field of Classification Search ........ 712/214, 712/215, 216, 217, 218, 205–207; 718/103, 718/104
See application file for complete search history.

(56) References Cited

U.S. PATENT DOCUMENTS 3,863,225 A * 1/1975 Preiss .................. 710/244
5,651,125 A * 7/1997 Witt et al. ............. 712/218

* cited by examiner

*Primary Examiner*—Fritz Fleming
*Assistant Examiner*—Tonia L. Meonske
(74) *Attorney, Agent, or Firm*—Hitt Gaines PC (57) ABSTRACT

A mechanism for resource allocation in a processor, a method of allocating resources in a processor and a digital signal processor incorporating the mechanism or the method. In one embodiment, the mechanism includes: (1) categorization logic, associated with an earlier pipeline stage, that generates instruction type information for instructions to be executed in the processor and (2) priority logic, associated with a later pipeline stage, that allocates functional units of the processor to execution of the instructions based on the instruction type information.

20 Claims, 6 Drawing Sheets

MECHANISM FOR RESOURCE ALLOCATION IN A DIGITAL SIGNAL PROCESSOR BASED ON INSTRUCTION TYPE INFORMATION AND FUNCTIONAL PRIORITY AND METHOD OF OPERATION THEREOF

TECHNICAL FIELD OF THE INVENTION

The present invention is directed, in general, to digital signal processors (DSPs) and, more specifically, to a mechanism for resource allocation in a DSP and method of allocating processing resources in a DSP.

BACKGROUND OF THE INVENTION

Over the last several years, DSPs have become an important tool, particularly in the real-time modification of signal streams. They have found use in all manner of electronic devices and will continue to grow in power and popularity.

As time has passed, greater performance has been demanded of DSPs. In most cases, performance increases are realized by increases in speed. One approach to improve DSP performance is to increase the rate of the clock that drives the DSP. As the clock rate increases, however, the DSP's power consumption and temperature also increase. Increased power consumption is expensive, and intolerable in battery-powered applications. Further, high circuit temperatures may damage the DSP. The DSP clock rate may not increase beyond a threshold physical speed at which signals may traverse the DSP. Simply stated, there is a practical maximum to the clock rate that is acceptable to conventional DSPs.

An alternate approach to improve DSP performance is to increase the number of instructions executed per clock cycle by the DSP ("DSP throughput"). One technique for increasing DSP throughput is pipelining, which calls for the DSP to be divided into separate processing stages (collectively termed a "pipeline"). Instructions are processed in an "assembly line" fashion in the processing stages. Each processing stage is optimized to perform a particular processing function, thereby causing the DSP as a whole to become faster.

"Superpipelining" extends the pipelining concept further by allowing the simultaneous processing of multiple instructions in the pipeline. Consider, as an example, a DSP in which each instruction executes in six stages, each stage requiring a single clock cycle to perform its function. Six separate instructions can therefore be processed concurrently in the pipeline; i.e., the processing of one instruction is completed during each clock cycle. The instruction throughput of an n-stage pipelined architecture is therefore, in theory, n times greater than the throughput of a non-pipelined architecture capable of completing only one instruction every n clock cycles.

Another technique for increasing overall DSP speed is "superscalar" processing. Superscalar processing calls for multiple instructions to be processed per clock cycle. Assuming that instructions are independent of one another (the execution of each instruction does not depend upon the execution of any other instruction), DSP throughput is increased in proportion to the number of instructions processed per clock cycle ("degree of scalability"). If, for example, a particular DSP architecture is superscalar to degree three (i.e., three instructions are processed during each clock cycle), the instruction throughput of the DSP is theoretically tripled.

These techniques are not mutually exclusive; DSPs may be both superpipelined and superscalar. However, operation of such DSPs in practice is often far from ideal, as instructions tend to depend upon one another and are also often not executed efficiently within the pipeline stages. In actual operation, instructions often require varying amounts of DSP resources, creating interruptions ("bubbles" or "stalls") in the flow of instructions through the pipeline. Consequently, while superpipelining and superscalar techniques do increase throughput, the actual throughput of the DSP ultimately depends upon the particular instructions processed during a given period of time and the particular implementation of the DSP's architecture.

The speed at which a DSP can perform a desired task is also a function of the number of instructions required to code the task. A DSP may require one or many clock cycles to execute a particular instruction. Thus, in order to enhance the speed at which a DSP can perform a desired task, both the number of instructions used to code the task as well as the number of clock cycles required to execute each instruction should be minimized.

Most pertinent to the specific topic at hand, the efficiency with which processing resources are brought to bear to execute instructions affects overall processing speed. Each instruction a DSP encounters typically requires a specific resource for execution. For example, some instructions require only address generation, and others require only a specific logical or mathematical operation. Since most DSPs are divided into specific functional units, it is therefore advantageous to schedule these units so as to maximize the execution rate of instructions.

Unfortunately, identifying the processing resources a particular instruction may require and prioritizing that instruction's access to the appropriate processing resource(s) can involve significant delay. In a fast DSP, that delay can reduce the DSP's overall speed. What is needed in the art is a faster way to classify incoming instructions and to prioritize their access to processing resources, such that instructions are properly scheduled without adversely affecting the overall speed of the DSP.

SUMMARY OF THE INVENTION

To address the above-discussed deficiencies of the prior art, the present invention provides a mechanism for resource allocation in a processor, a method of allocating resources in a processor and a digital signal processor incorporating the mechanism or the method. In one embodiment, the mechanism includes: (1) categorization logic, associated with an earlier pipeline stage, that generates instruction type information for instructions to be executed in the processor and (2) priority logic, associated with a later pipeline stage, that allocates functional units of the processor to execution of the instructions based on the instruction type information.

The present invention therefore introduces the broad concept of prioritizing resources using a process that is broken into stages to render it more compatible with a pipelined processor architecture. In an advantageous embodiment, each stage of the process requires only one clock cycle. This allows instructions to be properly categorized, and functional units to be allocated based on the categorization, every clock cycle.

In one embodiment of the present invention, the categorization logic causes the instruction type information to be stored and tagged in a queue containing the instructions. In an embodiment to be illustrated and described, the queue takes the form of a categorization queue that exists in an instruction queue within an instruction issue unit of an exemplary processor.

In one embodiment of the present invention, the earlier pipeline stage is a fetch/decode stage of the processor. In a related embodiment, the instructions are ungrouped when the categorization logic generates the instruction type information. In an embodiment to be illustrated and described, the fetch/decode stage is prior to the group stage. Those skilled in the pertinent art will understand, however, that the earlier stage may be any suitable early stage in a pipeline.

In one embodiment of the present invention, the instruction type information defines at least four categories of instruction. In an embodiment to be illustrated and described, the instruction type information defines six categories: 0 through 5.

In one embodiment of the present invention, the priority logic employs separate allocation schemes (methods) depending upon categories defined by the instruction type information. In an embodiment to be illustrated and described, one method is employed for category 0 and another method is employed for the remaining categories.

In one embodiment of the present invention, the processor is a digital signal processor. Those skilled in the pertinent art will understand, however, that the principles of the present invention can find application in processors of many types, including non-DSP, general purpose microprocessors.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
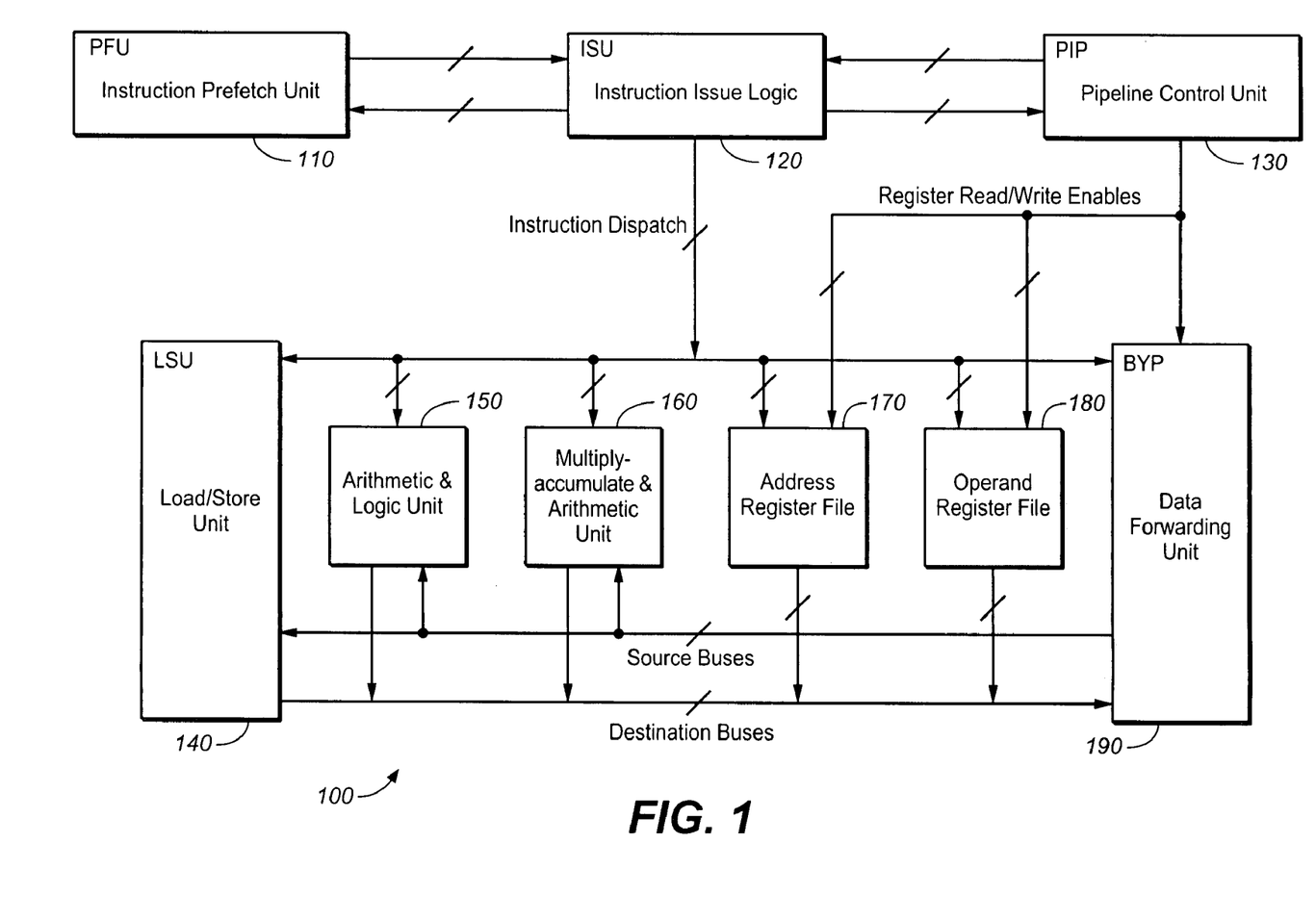
FIG. 1 illustrates an exemplary wide-issue DSP which may form an environment within which a mechanism for resource allocation constructed according to the principles of the present invention can operate.

Referring initially to FIG. 1, illustrated is an exemplary DSP, generally designated 100, which may form an environment within which a mechanism for resource allocation constructed according to the principles of the present invention can operate. Those skilled in the pertinent art should understand that the mechanism for resource allocation of the present invention may be applied to advantage in other conventional or later-discovered DSP or general-purpose, non-DSP, processor architectures.

The DSP 100 contains an instruction prefetch unit (PFU) 110. The PFU 110 is responsible for anticipating (sometimes guessing) and prefetching from memory the instructions that the DSP 100 will need to execute in the future. The PFU 110 allows the DSP 100 to operate faster, because fetching instructions from memory involves some delay. If the fetching can be done ahead of time and while the DSP 100 is executing other instructions, that delay does not prejudice the speed of the DSP 100.

The DSP 100 further contains instruction issue logic (ISU) 120. The ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., arithmetic logic unit, multiply-accumulate unit and address and operand register files) and retiring instructions after they have been executed or are otherwise no longer of use. Accordingly, the ISU 120 cooperates with the PFU 110 to receive prefetched instructions for issuance.

In a normal operating environment, the DSP 100 processes a stream of data (such as voice, audio or video), often in real-time. The DSP 100 is adapted to receive the data stream into a pipeline (detailed in Table 1 below and comprising eight stages). The pipeline is under control of a pipeline control unit (PIP) 130. The PIP 130 is responsible for moving the data stream through the pipeline and for ensuring that the data stream is operated on properly. Accordingly, the PIP 130 coordinates with the ISU 120 to ensure that the issuance of instructions is synchronized with the operation of the pipeline, that data serving as operands for the instructions are loaded and stored in proper place and that the necessary processing resources are available when required.

TABLE 1

Pipeline Stages

| Stage | Employed to |
| --- | --- |
| Fetch/Decode (F/D) | fetch and decode instructions |
| Group (GR) | check grouping and dependency rules group valid instructions execute return instructions |
| Read (RD) | read operands for address generation and control register update dispatch valid instructions to all functional units execute move immediate to control register instructions |
| Address Generation (AG) | calculate addresses for all loads and stores execute bit operations on control registers |
| Memory Read 0 (M0) | send registered address and request to the memory subsystem. |
| Memory Read 1 (M1) | load data from the memory subsystem register return data in the ORF (term defined below) |

TABLE 1-continued

Pipeline Stages

| Stage | Employed to |
|---|---|
| Execute (EX) | read operands for execution from the ORF. execute remaining instructions write results to the ORF or send results to BYP (term defined below) |
| Writeback (WB) | register results in the ORF or the ARF (term defined below) |

A load/store unit (LSU) 140 is coupled to, and under the control of, the PIP 130. The LSU 140 is responsible for retrieving the data that serves as operands for the instructions from memory (a process called "loading") and saving that data back to the memory as appropriate (a process called "storing"). Accordingly, though FIG. 1 does not show such, the LSU 140 is coupled to a data memory unit, which manages data memory to load and store data as directed by the LSU 140. The DSP 100 may be capable of supporting self-modifying code (code that changes during its own execution). If so, the LSU 140 is also responsible for loading and storing instructions making up that code as though the instructions were data.

As mentioned above, the DSP 100 contains various processing resources that can be brought to bear in the execution of instructions and the modification of the data in the data stream. An arithmetic logic unit (ALU) 150 performs general mathematical and logical operations (such as addition, subtraction, shifting, rotating and Boolean operations) and is coupled to, and under control of, both the ISU 120 and the PIP 130. A multiply-accumulate unit (MAC) and another ALU are provided in a MAC/accumulate unit (MAU) 160 to perform multiplication and division calculations and calculations that are substantially based on multiplication or division and, as the ALU 150, is coupled to, and under control of, both the ISU 120 and the PIP 130.

The DSP 100 contains very fast, but small, memory units used to hold information needed by instructions executing in the various stages of the pipeline. That memory is divided into individually designated locations called "registers." Because the various stages of the pipeline employ the registers in their instruction-processing, the registers are directly accessible by the stages. The DSP 100 specifically contains an address register file (ARF) 170 and an operand register file (ORF) 180. As the names imply, the ARF 170 holds addresses (typically corresponding to memory locations containing data used by the stages) and the ORF 180 holds operands (data that can be directly used without having to retrieve it from further memory locations).

Certain data may be required for more than one instruction. For example, the results of one calculation may be critical to a later calculation. Accordingly, a data forwarding unit (BYP) 190 ensures that results of earlier data processing in the pipeline are available for subsequent processing without unnecessary delay.

Though not illustrated in FIG. 1, the DSP 100 has an overall memory architecture that 100 is typical of conventional DSPs and microprocessors. That is, its registers are fast but small; its instruction and date caches (contained respectively in the PFU 110 and the LSU 140) are larger, but still inadequate to hold more than a handful of instructions or data; its local instruction memory and data memory 122 are larger still, but may be inadequate to hold an entire program or all of its data. An external memory (not located within the DSP 100 itself) is employed to hold any excess instructions or data.

It should be noted in this context that the illustrated DSP 100 is of a Harvard architecture. Its instruction and data memories are separate, controlled by separate controllers and separately addressed by the PFU 110 and the LSU 140, respectively. Those skilled in the pertinent art should understand, however, that the principles of the present invention are as easily applied to a von Neumann architecture (one in which instruction and data memories are merged into a single logical entity).

Figure 2:
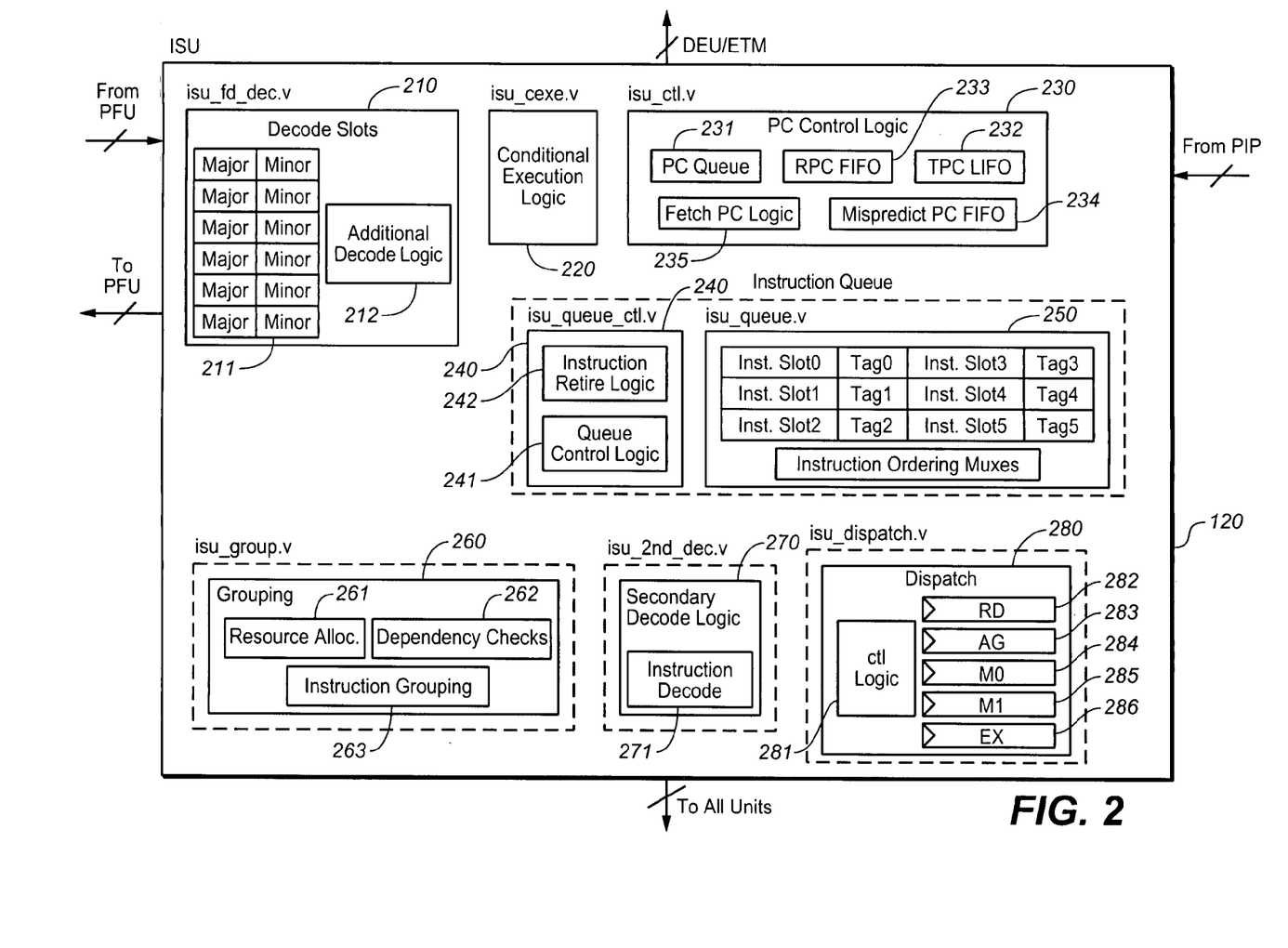
FIG. 2 illustrates in greater detail an instruction issue unit of the DSP of FIG. 1.

Turning now to FIG. 2, illustrated in greater detail is the ISU 120 of FIG. 1. Recall that the ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., the ALU 150, the MAU 160, the ARF 170 and the ORF 180) and retiring instructions after they have been executed, invalidated or are otherwise no longer of use.

The illustrated ISU 120 is capable of decoding and issuing up to six instructions in order. To perform this function, the ISU 120 receives partially decoded instructions from an instruction queue within the PFU 110 of FIG. 1 and communicates with the F/D, GR, RD, AG, M0 and M1 stages of the pipeline to issue the instructions as appropriate.

The ISU 120 contains an instruction decode block isu_fd_dec 210; a conditional execution logic block isu_cexe 220; a program counter (PC) controller isu_ctl 230; an instruction queue (containing an instruction queue control block isu_queue_ctl 240 and an instruction queue block isu_queue 250); an instruction grouping block isu_group 260; a secondary control logic block isu__2nd_dec 270; and a dispatch logic block isu_dispatch 280.

The PFU 110 sends up to six partially-decoded and aligned instructions to isu_fd_dec 210. These instructions are stored in a six slot queue 211. Each slot in the queue 211 consists of major and minor opcode decoders and additional decode logic 212. The instructions are fully decoded in the F/D stage of the pipeline. The instructions in the queue 211 are only replaced (retired) from the queue 211 after having been successfully grouped in the GR stage.

The contents of the queue 211 are sent to grouping logic in the GR stage of the pipeline for hazard detection. Instruction grouping logic 263 within isu_group 260 governs the GR stage. The instruction grouping logic 263 embodies a predefined set of rules, implemented in hardware (including logic 262 devoted to performing dependency checks, e.g., write-after-write, read-after-write and write-after-read), that determines which instructions can be grouped together for execution in the same clock cycle. The grouping process is important to the operation and overall performance of the DSP 100, because instruction opcodes, instruction valid signals, operand register reads and relevant signals are dispatched to appropriate functional units in subsequent pipeline stages based upon its outcome. Resource allocation logic 261 assists in the dispatch of this information.

The conditional execution logic block isu_cexe 220 is responsible for identifying conditional execution (cexe) instructions and tagging the beginning and ending instructions of the cexe blocks that they define in the queue 211. When instructions in a cexe block are provided to the GR stage, they are specially tagged to ensure that the instruction grouping logic 263 groups them for optimal execution.

The PC controller isu_ctl 230 includes a PC register, a trap PC (TPC) register, activated when an interrupt is asserted, and a return PC (RPC) register, activated when a call occurs. These registers have associated queues: a PC queue 231, a TPC last-in, first-out queue 232 and an RPC first-in, first-out queue 233. isu_ctl 230 also contains logic to update these registers and queues 231, 232, 233. A mispredict PC register, a mispredict first-in, first-out queue 234 and associated logic keep track of mispredictions. Fetch PC logic 235 controls the prefetching of instructions and, accordingly, the PFU 110 of FIG. 1. Subsequent PCS are calculated based on the number of the instructions grouped in the GR stage and the current state of the DSP 100. The state of the DSP 100 is affected by interrupts, branch mispredictions and return instructions.

The instruction queue (containing isu_queue_ctl 240 and isu_queue 250) actually contains the instructions which are queued for dispatch to the pipeline. The queue itself, isu_queue 250, has six 91-bit entries and input and output multiplexers (not referenced in FIG. 2, but referenced in FIG. 4 and described in detail). isu_queue 250 has a variable depth that depends upon the number of instructions grouped therein. isu_queue_ctl 240 contains all isu_queue 250 control logic 241 and instruction retire logic 242. For the purpose of saving power, this instruction retire logic 242 checks for "tight loops." A "tight loop" is defined as a loop that has a maximum of six instructions. A tight loop can and should continue to reside within isu_queue 250 until it has been executed for the last time. This saves power and time by foregoing repeated reloading of the tight loop. As instructions are retired from isu_queue 250, newly decoded instructions in the queue 211 can be written to its empty slots.

The secondary control logic block isu_2nd_dec 270 provides additional instruction decode logic 271 for the GR, RD, M0 and M1 stages of the pipeline. The main function of the additional instruction decode logic 271 is to provide additional information from each instruction's opcode to isu_group 260. The instruction decoders in isu_2nd_dec 270 are the same as those employed in the additional decode logic 212 of isu_fd_dec 210.

Finally, the dispatch logic block isu_dispatch 280 includes control logic 281, five native opcode staging registers 282, 283, 284, 285, 286 (corresponding to the RD, AG, M0, M1 and EX stages of the pipeline) and logic (not shown) to generate instruction valid signals. isu_dispatch 280 also transmits register addresses for source and destination registers and read enable signals to the BYP 190, the ORF 180, and the ARF 170. Among other things, the control logic 281 uses grouping information and a branch mispredict signal to determine when the staging registers 282, 283, 284, 285, 286 require updating.

Figure 3:
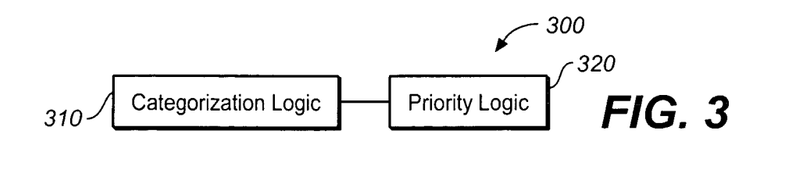
FIG. 3 illustrates a mechanism for resource allocation in a wide-issue DSP.

Turning now to FIG. 3, illustrated is a mechanism, generally designated 300, for resource allocation in a DSP, such as the DSP 100 of FIG. 1. The mechanism 300 includes categorization logic 310. The categorization logic 310 is, in the illustrated embodiment, associated with the F/D stage of the pipeline (the first, and therefore an earlier, pipeline stage). The categorization logic 310 generates instruction type information for instructions to be executed in the processor.

The categorization logic 310 of the illustrated embodiment generates instruction type tag bits as set forth in Table 2, below.

TABLE 2

Instruction Categories

| Bit Position | Category | Bit Description |
| --- | --- | --- |
| isu_instX_fd[32] | ISU Type | 0 - None<br>1 - bcc/br/call IMM, agnx, ret/reti |
| isu_instX_fd[33] | PIP Type | 0 - None<br>1 - bits/bitc/biti cX, y (excluding %hwflag, %vitr) |
| isu_instX_fd[35:32] | MAU Type | 0xxx - None<br>1001 - MAU<br>1010 - VIT/40-bit ALU/40-bit Move/Guard Move<br>1101 - Quad MAU |
| isu_instX_fd[39:36] | ALU Type | 0xxx - None<br>1001 - ALU Diva/Insert/Extract<br>1010 - 32-bit ALU<br>1100 - 40-bit ALU |
| isu_instX_fd[44:40] | LSU Type | 0_xxxx - None<br>1_0000 - AGU<br>1_0001 - Load<br>1_0011 - Load update<br>1_0100 - Store<br>1_1100 - Store update |

There are eight instruction types in the embodiment set forth in Table 2: ALU, ALU01, (32-bit complex ALU), LSU, MAU (mac, vit and 40-bit alu), ALU/MAU (16-bit alu), ALU01/MAU (32-bit simple alu), ISU (bcc/br/call IMM, ret/reti, agnx), PIP (bits/bitc/biti cX, y and cexe, excluding % hwflag, % vitr). The instruction type information is generated in the F/D stage of the pipeline using the categorization logic 310 and stored in a categorization queue that will now be described.

Figure 4:
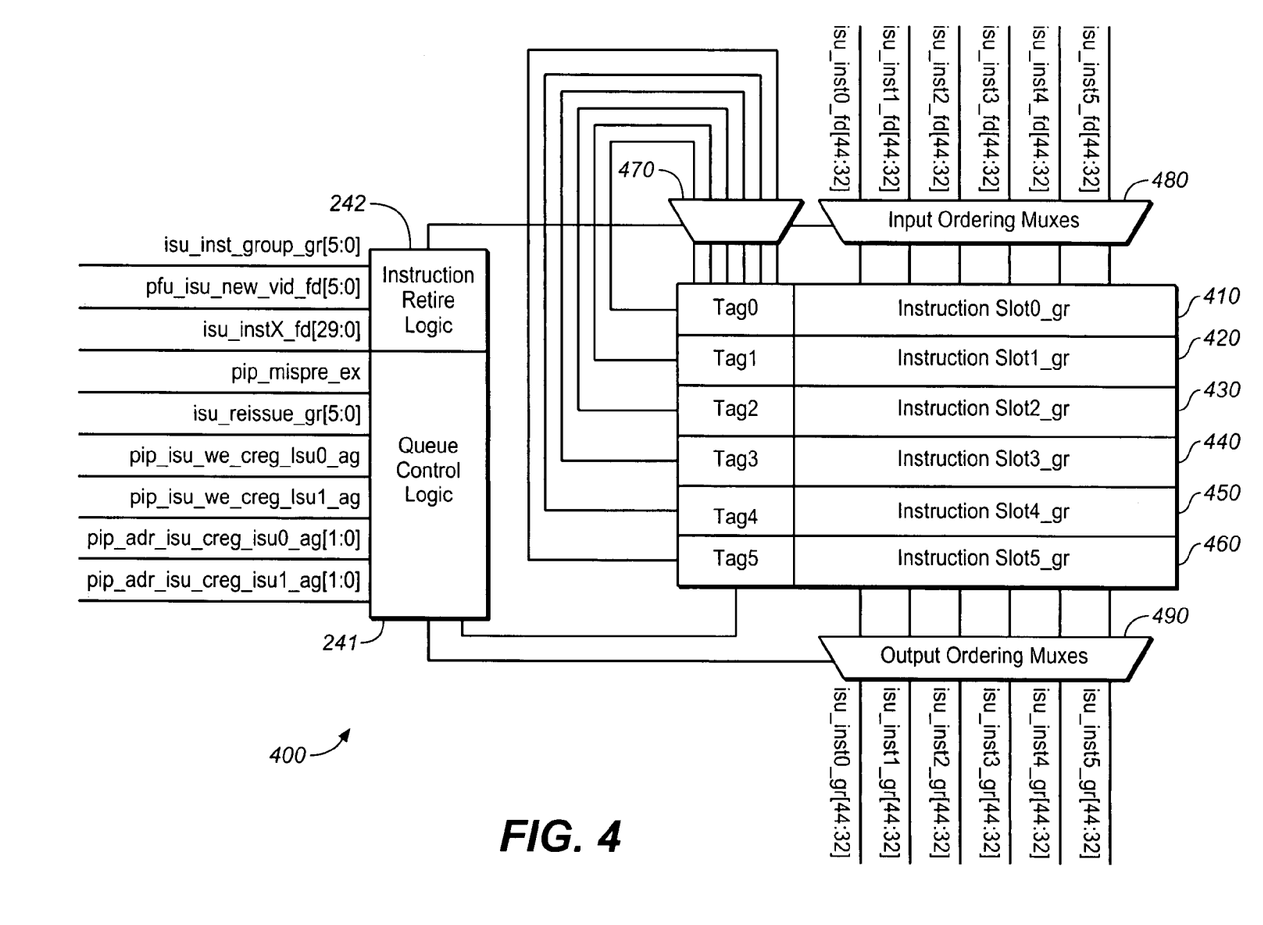
FIG. 4 illustrates a categorization queue that is part of the instruction queue of the instruction issue unit of FIG. 2.

Turning now to FIG. 4, illustrated is a categorization queue, generally designated 400, that, in the illustrated embodiment, is part of isu_queue 250 of the ISU 120. The categorization queue 400 is designed to receive instructions that have been categorized, along with associated instruction type information. That information takes the form of instruction type tag bits in the illustrated embodiment.

Accordingly, the categorization queue 400 has six instruction slots: slot0 410, slot1 420, slot2 430, slot3 440, slot4 450 and slot5 460. The instruction slots 410, 420, 430, 440, 450, 460 have associated tag spaces 411, 421, 431, 441, 451, 461. The tag spaces 411, 421, 431, 441, 451, 461 are designed to receive the instruction type tag bits. The categorization queue 400 further has input ordering multiplexers 470, 480 for respective tags and instructions stored in the queue and an output ordering multiplexer 490 for the instructions stored in the queue. These multiplexers 470, 480, 490 allow the instructions slots 410, 420, 430, 440, 450, 460 to be written to and read from in any order.

The instruction type tag bits are encoded in 5-bit alloc buses as explained in Table 3:

TABLE 3

Alloc Buses for Resource Allocation

| isu_allocX_fd[4:0] | Description |
| --- | --- |
| 00000 | None (NOP) |
| 00001 | ALU |
| 00010 | ALU0 and ALU1 |
| 00100 | MAU |
| 00101 | MAU or ALU |

TABLE 3-continued

Alloc Buses for Resource Allocation

| isu_allocX_fd[4:0] | Description |
| --- | --- |
| 00110 | MAU or (ALU0 and ALU1) |
| 01000 | PIP |
| 10000 | ISU |

Turning back to FIG. 3, the mechanism 300 further includes priority logic 320. The priority logic 320 is associated with the GR stage of the pipeline (the second stage of the pipeline, and therefore a later pipeline stage). The priority logic 320 allocates functional units of the processor (such as the LSU 140, the ALU 150 and the MAU 160) to execution of the instructions based on the instruction type information. The categorization logic 310 and the priority logic 320 cooperate in this manner to effect a resource allocation process that is broken into stages to render it more compatible with a pipelined processor architecture. In an advantageous embodiment, the categorization logic 310 (processed in the F/D stage) and the priority logic 320 (processed in the GR stage) each require only one clock cycle to perform their respective tasks. This prevents bubbles from being inserted into the pipeline by reason of resource allocation.

The priority logic 320 prioritizes instructions based on the order in which the instructions are arranged in the categorization queue 400. The instruction in slot0 410 has the highest priority, followed by instructions in slot1 420 and so on. The instruction in slot5 460 has the lowest priority.

Next, the priority logic 320 allocates resources based on the priority of the various functional units in the DSP 100. That priority is as set forth in Table 4, below:

TABLE 4

Priority of Functional Units

| Functional Units | Priority |
| --- | --- |
| ISU | 1 |
| PIP | 1 |
| LSU0 | 1 |
| LSU1 | 2 |
| ALU0 | 1 |
| ALU1 | 2 |
| MAU0 | 3 |
| MAU1 | 4 |

Since processing resources (functional units) are always available for the instruction in slot0 410, one allocation scheme (the method of FIG. 5) is employed for that instruction. Resources are allocated for the remaining instructions (slot1 420 through slot5 460) based on another allocation scheme (the method of FIG. 6).

Figure 5:
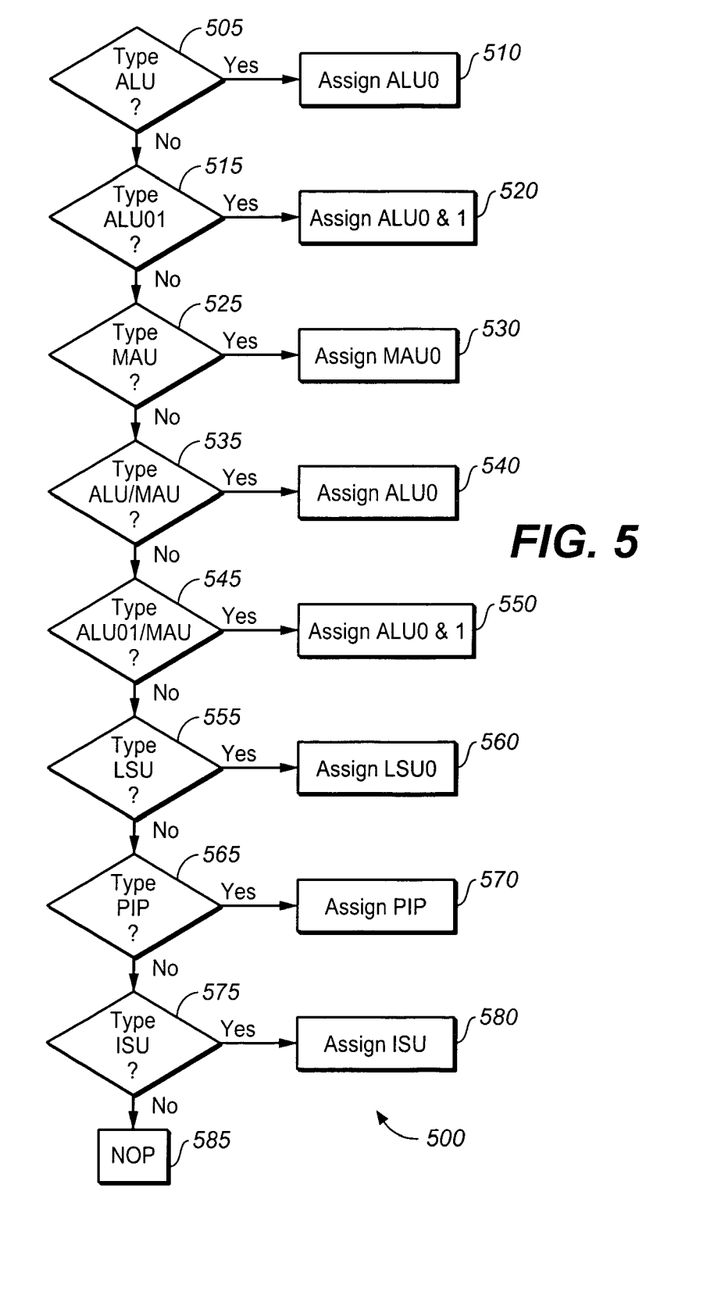
FIG. 5 illustrates a method of allocating processing resources for instruction 0.

Turning now to FIG. 5, illustrated is a method, generally designated 500, of allocating processing resources for the instruction in slot0 410. The method 500 begins in a decisional step 505 wherein, if the instruction in slot0 410 is an ALU type (YES branch), the ALU0 is allocated (in a step 510). If not (NO branch), a decisional step 515 determines whether the instruction in slot0 410 is an ALU01 type. If so (YES branch), the ALU0 and the ALU1 are allocated (in a step 520). If not (NO branch), a decisional step 525 determines whether the instruction in slot0 410 is a MAU type. If so (YES branch), the MAU0 is allocated (in a step 530). If not (NO branch), a decisional step 535 determines whether the instruction in slot0 410 is an ALU01/MAU type. If so (YES branch), the ALU0 is allocated (in a step 540). If not (NO branch), a decisional step 545 determines whether the instruction in slot0 410 is an ALU01/MAU type. If so (YES branch), the ALU0 and ALU1 are allocated (in a step 550). If not (NO branch), a decisional step 555 determines whether the instruction in slot0 410 is an LSU type. If so (YES branch), the LSU0 is allocated (in a step 560). If not (NO branch), a decisional step 565 determines whether the instruction in slot0 410 is a PIP type. If so (YES branch), the PIP is allocated (in a step 570). If not (NO branch), a decisional step 575 determines whether the instruction in slot0 410 is an ISU type. If so (YES branch), the ISU is allocated (in a step 580). If not (NO branch), a step 585 determines that the instruction in slot0 410 is a NOP type, and the method 500 ends.

Figures 6, 6A:
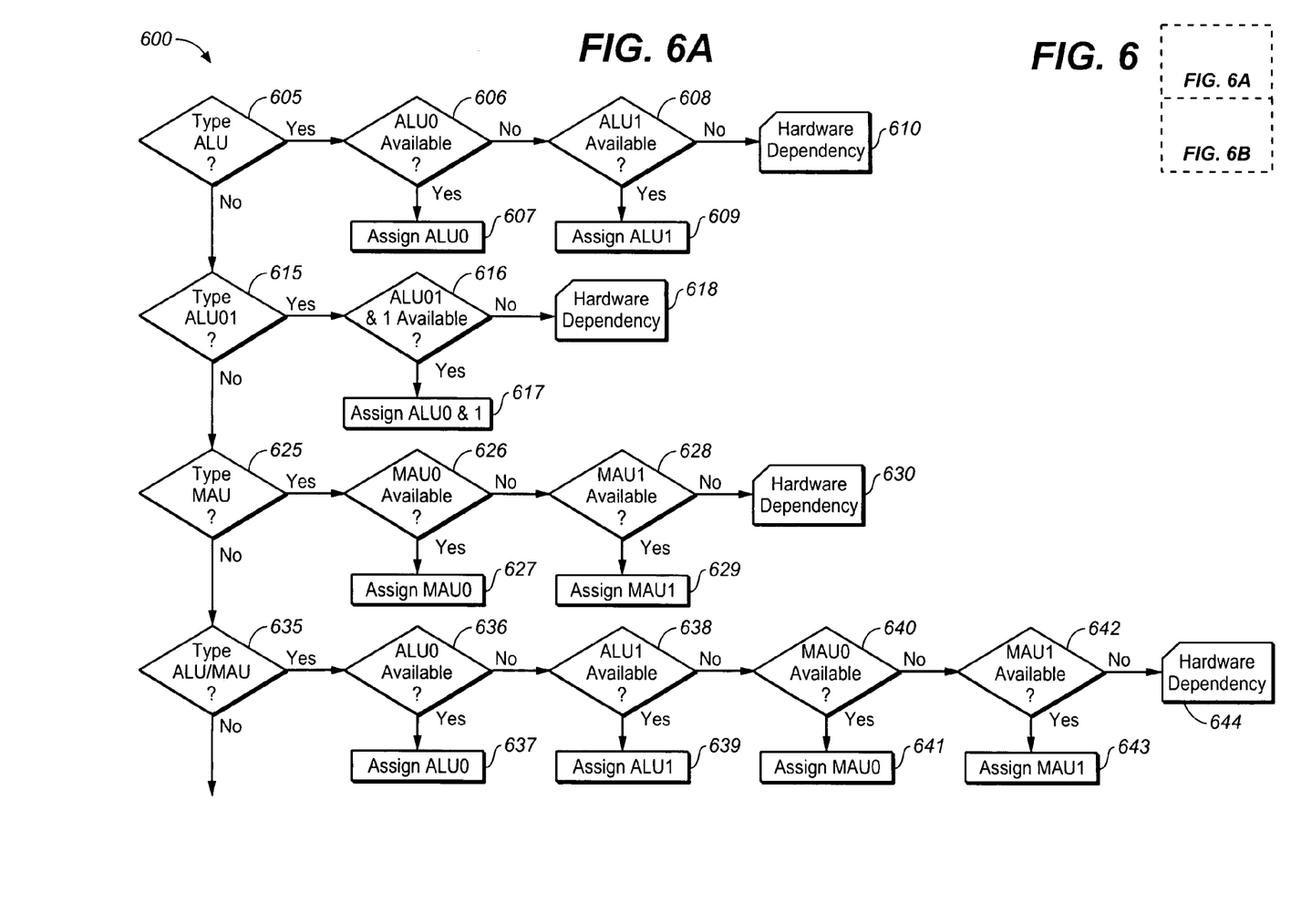
FIG. 6 illustrates a method of allocating processing resources for instructions 1 through 5.
Figure 6B:
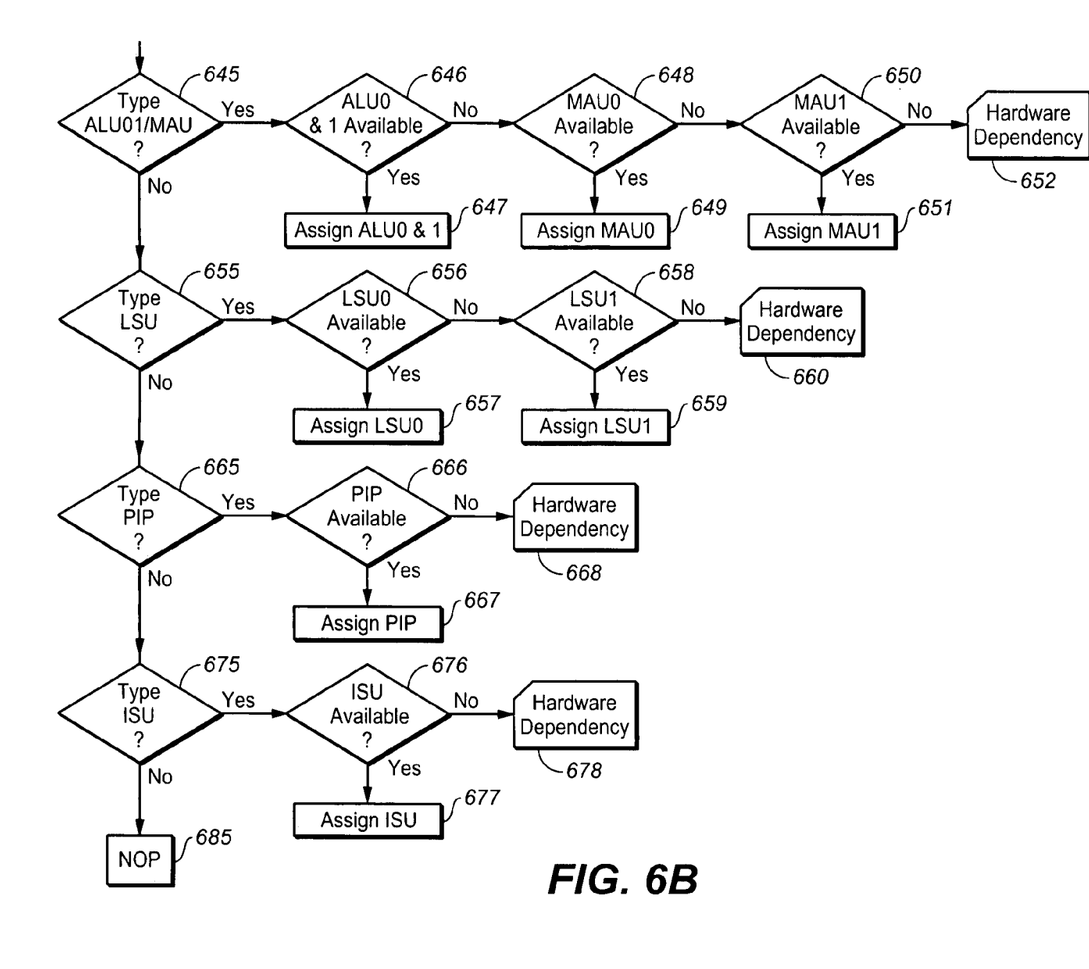

Turning now to FIG. 6, illustrated is a method of allocating processing resources for instructions in slot1 420 through slot5 460. The method 600 begins in a decisional step 605 wherein, if the instruction in any slot other than the slot0 410 is an ALU type (YES branch), it is determined in a decisional step 606 whether the ALU0 is available. If so (YES branch), the ALU0 is allocated (in a step 607). If not (NO branch), it is determined in a decisional step 608 whether the ALU1 is available. If so (YES branch), the ALU1 is allocated (in a step 609). If not (NO branch), a hardware dependency exists (in a step 610), and a resource is not allocated to the instruction until a later clock cycle when either the ALU0 or the ALU1 resource becomes available.

If the instruction in any slot other than the slot0 410 is not an ALU type (NO branch), a decisional step 615 determines whether that instruction is an ALU01 type. If so (YES branch), it is determined in a decisional step 616 whether both the ALU0 and the ALU1 are available. If so (YES branch), both the ALU0 and the ALU01 are allocated (in a step 617). If not (NO branch), a hardware dependency exists (in a step 618), and a resource is not allocated to the instruction until a later clock cycle when both the ALU0 and the ALU1 resources become available.

If the instruction in any slot other than the slot0 410 is not an ALU01 type (NO branch), a decisional step 625 determines whether that is a MAU type. If so (YES branch), it is determined in a decisional step 626 whether the MAU0 is available. If so (YES branch), the MAU0 is allocated (in a step 627). If not (NO branch), it is determined in a decisional step 628 whether the MAU1 is available. If so (YES branch), the MAUL is allocated (in a step 629). If not (NO branch), a hardware dependency exists (in a step 630), and a resource is not allocated to the instruction until a later clock cycle when either the MAU0 or the MAUL resource becomes available.

If the instruction in any slot other than the slot0 410 is not an MAU type (NO branch), a decisional step 635 determines whether that instruction is an ALU/MAU type. If so (YES branch), it is determined in a decisional step 636 whether the ALU0 is available. If so (YES branch), the ALU0 is allocated (in a step 637). If not (NO branch), it is determined in a decisional step 638 whether the ALU1 is available. If so (YES branch), the ALU1 is allocated (in a step 639). If not (NO branch), it is determined in a decisional step 640 whether the MAU0 is available. If so (YES branch), the MAU0 is allocated (in a step 641). If not (NO branch), it is determined in a decisional step 642 whether the MAU1 is available. If so (YES branch), the MAU1 is allocated (in a step 643). If not (NO branch), a hardware dependency exists (in a step 644), and a resource is not allocated to the instruction until a later clock cycle when either the ALU0, the ALU1, the MAU0 or the MAU1 resource becomes available.

If the instruction in any slot other than the slot0 410 is not an ALU/MAU type (NO branch), a decisional step 645 determines whether that instruction is an ALU01/MAU type. If so (YES branch), it is determined in a decisional step 646 whether both the ALU0 and the ALU1 are available. If so (YES branch), both the ALU0 and the ALU01 are allocated (in a step 647). If not (NO branch), it is determined in a decisional step 648 whether the MAU0 is available. If so (YES branch), the MAU0 is allocated (in a step 649). If not (NO branch), it is determined in a decisional step 650 whether the MAU1 is available. If so (YES branch), the MAU1 is allocated (in a step 651). If not (NO branch), a hardware dependency exists (in a step 652), and a resource is not allocated to the instruction until a later clock cycle when either both the ALU0 and the ALU1, the MAU0 or the MAU1 resources become available.

If the instruction in any slot other than the slot0 410 is not an ALU01/MAU type (NO branch), a decisional step 655 determines whether that instruction is an LSU type. If so (YES branch), it is determined in a decisional step 656 whether the LSU0 is available. If so (YES branch), the LSU0 is allocated (in a step 657). If not (NO branch), it is determined in a decisional step 658 whether the LSU1 is available. If so (YES branch), the LSU1 is allocated (in a step 659). If not (NO branch), a hardware dependency exists (in a step 660), and a resource is not allocated to the instruction until a later clock cycle when either the LSU0 or the LSU1 resource becomes available.

If the instruction in any slot other than the slot0 410 is not an LSU type (NO branch), a decisional step 665 determines whether that instruction is a PIP type. If so (YES branch), it is determined in a decisional step 666 whether the PIP is available. If so (YES branch), the PIP is allocated (in a step 667). If not (NO branch), a hardware dependency exists (in a step 668), and a resource is not allocated to the instruction until a later clock cycle when the PIP resource becomes available.

If the instruction in any slot other than the slot0 410 is not a PIP type (NO branch), a decisional step 675 determines whether that instruction is an ISU type. If so (YES branch), it is determined in a decisional step 676 whether the ISU is available. If so (YES branch), the ISU is allocated (in a step 677). If not (NO branch), a hardware dependency exists (in a step 678), and a resource is not allocated to the instruction until a later clock cycle when the ISU resource becomes available.

If the instruction in any slot other than the slot0 410 is not an ISU type (NO branch), a step 685 deduces that the instruction must be a NOP (no-op) type, and the method 600 ends.

Although the present invention has been described in detail, those skilled in the art should understand that they can make various changes, substitutions and alterations herein without departing from the spirit and scope of the invention in its broadest form.

What is claimed is:

1. A mechanism for resource allocation in a processor, comprising:
   categorization logic, associated with an earlier pipeline stage, that generates instruction type information for instructions to be executed in said processor;
   queuing logic, in which said instructions and said instruction type information are stored in an order based on a priority of said instructions derived from a priority of functional units in said processor; and
   priority logic, associated with a later pipeline stage, that allocates functional units of said processor to execution of said instructions in said order based on said instruction type information.

2. The mechanism as recited in claim 1 wherein said categorization logic causes said instruction type information to be stored and tagged in a queue containing said instructions.

3. The mechanism as recited in claim 1 wherein said earlier pipeline stage is a fetch/decode stage of said processor.

4. The mechanism as recited in claim 1 wherein said instructions are ungrouped when said categorization logic generates said instruction type information.

5. The mechanism as recited in claim 1 wherein said instruction type information defines at least four categories of instruction.

6. The mechanism as recited in claim 1 wherein said priority logic employs separate allocation schemes depending upon categories defined by said instruction type information.

7. The mechanism as recited in claim 1 wherein said processor is a digital signal processor.

8. A method of allocating resources in a processor, comprising:
   generating instruction type information for instructions to be executed in said processor in an earlier clock cycle thereof;
   storing said instructions and said instruction type information in a queue in an order based on a priority of said instructions derived from a priority of functional units in said processor; and
   allocating functional units of said processor to execution of said instructions in said order based on said instruction type information in a later clock cycle of said processor.

9. The method as recited in claim 8 further comprising storing said instruction type information is tagged in a queue containing said instructions.

10. The method as recited in claim 8 wherein said generating is carried out in a fetch/decode stage of said processor.

11. The method as recited in claim 8 wherein said instructions are ungrouped when said generating is carried out.

12. The method as recited in claim 8 wherein said instruction type information defines at least four categories of instruction.

13. The method as recited in claim 8 wherein said allocating comprises employing separate allocation schemes depending upon categories defined by said instruction type information.

14. The method as recited in claim 8 wherein said processor is a digital signal processor.

15. A digital signal processor (DSP), comprising:
   a pipeline having stages;
   functional units coupled to said pipeline;
   an instruction issue unit, coupled to said functional units, that wide-issues instructions for execution in said functional units;
   categorization logic, associated with an earlier stage of said pipeline, that generates instruction type information for said instructions;
   queuing, in which said instructions and said instruction type information are stored in an order based on a priority of said instructions derived from a priority of functional units in said processor; and priority logic, associated with a later stage of said pipeline, that allocates said functional units to said execution of said instructions in said order based on said instruction type information.

16. The DSP as recited in claim 15 wherein said categorization logic causes said instruction type information to be stored and tagged in a categorization queue located in said instruction issue unit and containing said instructions.

17. The DSP as recited in claim 15 wherein said earlier stage is a fetch/decode stage.

18. The DSP as recited in claim 15 wherein said instructions are ungrouped when said categorization logic generates said instruction type information.

19. The DSP as recited in claim 15 wherein said instruction type information defines at least four categories of instruction.

20. The DSP as recited in claim 15 wherein said priority logic employs separate allocation schemes depending upon categories defined by said instruction type information.

* * * * *